United States Patent Office 3,310,510
Patented Mar. 21, 1967

1

3,310,510
POLYOLEFINS STABILIZED WITH THE COMBINATION OF A NICKEL SALT OF A CARBOXYLIC ACID AND A PHENOLIC ANTIOXIDANT
David S. Breslow, Wilmington, Del., assignor to Hercules Incorporated, a corporation of Delaware
No Drawing. Filed July 30, 1964, Ser. No. 386,441
6 Claims. (Cl. 260—23)

This application is a continuation-in-part of my copending application Serial No. 215,269, filed August 7, 1962, which is now abandoned.

The present invention relates to polyolefin compositions and, more particularly, to the stabilization of polyethylene and stereoregular polymers of propylene and higher $\alpha$-olefins against degradation by light.

Highly crystalline, high molecular weight stereoregular polymers of ethylene, propylene, and higher $\alpha$-olefins are well known and widely used. However, one of the deficiencies of such polymers which must be overcome to enable their use in many applications is poor stability to light.

It is known from U.S. 2,984,634 that the dyeing properties of crystallizable polymers of olefins can be improved by incorporating in such polymers a small amount of a nickel salt of a carboxylic acid containing 6–12 carbon atoms. No ability of these nickel salts to stabilize polyolefins is recognized by the patentees and it is in fact doubtful if they possess any such ability on their own.

In accordance with the present invention, it has been found that the combination of a nickel salt of a hydrocarbon carboxylic acid and a small amount of a phenolic antioxidant is highly effective in stabilizing polyethylene and the stereoregular polymers of propylene and higher $\alpha$-olefins against degradation by light. Thus, the invention relates to polyethylene and stereoregular polymers of an $\alpha$-olefin having at least 3 carbon atoms containing as light stabilizer therefor a small amount of a nickel salt of a hydrocarbon carboxylic acid containing 2 to 22 carbon atoms and a phenolic antioxidant. By the term "hydrocarbon carboxylic acid" is meant any carboxylic acid derived from a hydrocarbon by substituting a COOH group for a hydrogen atom.

Although any polymer of a mono-$\alpha$-olefin having at least 2 carbon atoms can be stabilized by means of the invention, the invention is particularly useful is stabilizing stereoregular polymers of monoolefins having from 3 to 6 carbon atoms, including, for instance, polypropylene, poly(butene-1), poly(pentene-1), poly(3-methylbutene-1), and poly(4-methylpentene-1). Polyethylene, even though it degrades under the influence of light by a mechanism somewhat different than the above stereoregular polymers, is also susceptible to stabilization by the invention.

The nickel salts of the hydrocarbon carboxylic acids that are used to produce the compositions of the invention are known to the art and include, by way of example, the nickel salts of isobutyric, isovaleric, caproic, 2-ethylbutyric, 2-methyl-pentanoic, n-octanoic, 2-ethylhexanoic, 2,2,4,4-tetramethylpentanoic, 2,4,6-trimethylheptanoic, 5,7-dimethyloctanoic, pelargonic, lauric, tridecanoic, myristic, palmitic, stearic, naphthenic, 3-methylcyclohexane, carboxylic, 4-isopropylcyclohexane carboxylic, cyclohexane acetic, bicyclo(2,2,1) carboxylic, p(1,1,

2

3,3-tetramethylbutyl) benzoic, 2,4-diisopropyl naphthoic, octyl succinic, 2-decyl glutaric, 2,5-dibutyl adipic, sebacic acids, and the like. Mixtures of acids such as, for example, coconut fatty acids, are also suitable.

The phenolic antioxidants used to produce the compositions of the invention are also well known. Such antioxidants include, for example, polysubstituted phenols, poly(alkylphenol) substituted hydrocarbons, hydroxyphenyl polyalkylchromans, adducts of an alkylphenol and a cyclic terpene, thiobis(alkylphenol)s, and hydroxyphenoxy substituted triazines. The A-stage para-tertiary alkylphenol-formaldehyde resins such as are described in U.S. 2,968,641 are also suitable.

The polysubstituted phenols that can be used are either di- or trisubstituted phenols. Particularly preferred are the 2,4,6-trialkylphenols described in U.S. 2,581,907 to Smith, Jr., et al., the 2-aralkyl-4,6-dialkyl substituted phenols described in U.S. 2,967,853 to Spacht, and the mono-, di-, and tri(dialkyl hydroxybenzyl) phenols described in U.S. 3,053,803 to Jaffe, Rocklin, and Van Winkle. Inclusive of the trialkylphenols are: 2,4-dimethyl-6-tert-butylphenol, 2,4-dimethyl-6-(alpha,alpha,gamma,gamma-tetramethylbutyl)phenol, 2,6-di-tert-butyl-4-methylphenol, 2-methyl-4,6-di-tert-butylphenol, 2,6-di-tert-butyl-4-sec-butylphenol, 2,4,6-tri-tert-butylphenol, 2,4,6-triethylphenol, 2,4,6-tri-n-propylphenol, 2,4,6-triisopropylphenol, 2,6-di-tert-octyl-4-propylphenol, 2,6-di-tert-butyl-4-ethylphenol, 2,4-dicyclohexyl-6-methylphenyl, 2-isopropyl-4-methyl-6-tert-butylphenol, 2,4-dimethyl-6-tert-amylphenol, 2,4-di-tert-amyl-6-methylphenol, 2,6-di-tert-butyl-4-isopropylphenol, 2,6,di-tert-amyl-4-methylphenol, 2,6-di-tert-amyl-4-isopropylphenol, 2,4-diisopropyl-6-tert-butylphenol, 2,4-diisopropyl-6-sec-hexylphenol, 2-alphaphenylethyl-4-methyl-6-tert-butylphenol, and 2-alphaphenylethyl-4-methyl-6-tert-octylphenol. The preferred compounds of this class are those which have primary or secondary aralkyl groups or secondary or tertiary alkyl groups at the 2- and 6-position and a normal alkyl group at the 4-position, a representative of this class being 2,6-di-tert-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms.

The preferred aralkyl dialkyl substituted phenols are those which have a primary aralkyl radical, a secondary aralkyl radical, or a tertiary alkyl radical having 4 to 12 carbons ortho to a hydroxyl group. Particularly suitable are 2-alphaphenylethyl-4-methyl-6-tert-butylphenol and 2-alphaphenylethyl-4-methyl-6-tert-octylphenol. Particularly preferred mono-, di-, and tri(dialkyl hydroxylbenzyl) phenols include: p-(3,5-di-tert-butyl-4-hydroxybenzyl)phenol, p-(3,5-diisopropyl-4-hydroxybenzyl)phenol, o-(3-methyl-5-isopropyl-4-hydroxybenzyl)phenol, o-(3-butyl-5-tert-amyl-4-hydroxybenzyl)phenol, o-(3-5-di-tert-amyl-4-hydroxybenzyl)phenol, 2,6-di(3,5-di-tert-butyl-4-hydroxybenzyl)phenol, 2,6-di(3,5-di-tert-butyl-4-hydroxybenzyl)-4-methylphenol, 2,6-di(3-tert-butyl-5-methyl-2-hydroxybenzyl)-4-methylphenol, 2,6-di(3-methyl-5-tert-amyl-4-hydroxybenzyl)phenol, 2,6-di(3,5-diisopropyl- 4-hydroxybenzyl)phenol, 2,6-di(3,5-di-tert-hexyl-4-hydroxybenzyl)phenol, 2,4-di(3,5-diisopropyl-4-hydroxybenzyl)-6-tert-butylphenol, 2,4-di(3,5-di-tert-amyl-4-hydroxybenzyl)phenol, 2,4-di(3-isopropyl-5-tert-butyl-4-hydroxybenzyl)phenol, 2,4-di(3,5-di-tert-butyl-4-hydroxybenzyl)phenol, 2,4,6-tri(3,5-di-tert-butyl-4-hydroxybenzyl)phenol, 2,4,6-tri(3-methyl-5-tert-butyl-4-hydroxybenzyl)phenol, 2,4,6-tri(3,5-diisopropyl-4-hydroxybenzyl)phenol, and 2,4,6-tri(3-isopropyl-5-tert-octyl-4-hydroxybenzyl)-3-methylphenol.

The second class of phenolic antioxidants, the poly(alkylphenol) substituted hydrocarbons, that can be used are either bis, tris, or tetrakis phenols and preferably are alkylidene-bis(alkylphenol)s, α,ω-bisalkylidene-bis(alkylphenol)s, cycloalkylidene-bis(alkylphenol)s, benzylidene-bis(alkylphenol)s, and bis or tris(dialkyl hydroxybenzyl)alkyl benzenes. The alkylidene-bis(alkylphenol)s are characterized by the general formula

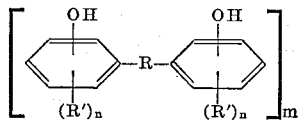

wherein R is an alkylidene radical of 1 to 5 carbon atoms and wherein R' is an alkyl group of 1 to 12 carbon atoms and $n$ is an integer from 1 to 3 and $m$ is an integer from 1 to 2. When more than one R' substituent is present on a phenyl group, each R' can be the same or different. Exemplary of the alkylidene-bis(alkylphenol)s that may be used are 2,2'-methylene-bis(5-isopropylphenol),
2,2'-methylene-bis(4-methyl-6-isopropylphenol),
2,2'-methylene-bis(4-methyl-6-tert-butylphenol),
2,2'-methylene-bis(4-tert-butyl-6-methylphenol),
2,2'-methylene-bis(4,6-di-tert-butylphenol),
2,2'-methylene-bis(4-nonylphenol),
2,2'-methylene-bis[4-methyl-6-(1-methylcyclohexyl)phenol],
2,2'-methylene-bis(4-decylphenol),
4,4'-methylene-bis(5-methyl-2-tert-butylphenol),
4,4'-methylene-bis[5-methyl-2-(1-methylcyclohexyl)phenol],
4,4'-methylene-bis(2,6-di-tert-butylphenol),
2,2'-isopropylidene-bis(5-methylphenol),
4,4'-methylene-bis(2-methyl-6-tert-butylphenol),
2,2'-ethylidene-bis(4-methyl-6-tert-butylphenol),
2,2'-ethylidene-bis(4,6-di-tert-butylphenol),
2,2'-ethylidene-bis(4-octylphenol),
2,2'-ethylidene-bis(4-nonylphenol),
2,2'-isopropylidene-bis(4-methyl-6-isopropylphenol),
2,2'-isopropylidene-bis(4-isopropylphenol),
2,2'-isopropylidene-bis(4-isopropyl-6-methylphenol),
2,2'-isopropylidene-bis(4-methyl-6-tert-butylphenol),
2,2'-isopropylidene-bis(4-octylphenol),
2,2'-isopropylidene-bis(4-nonylphenol),
2,2'-isopropylidene-bis(4-decylphenol),
2,2'-n-butylidene-bis(4-methyl-6-tert-butylphenol),
2,2'-isobutylidene-bis(4-methyl-6-tert-butylphenol),
2,2'-isobutylidene-bis(4-nonylphenol),
4,4'-n-butylidene-bis(2-tert-butyl-5-methylphenol), and the corresponding α,ω-bis(alkylidene)-bis(alkylphenol)s.

Also suitable are the cycloalkylidene bis(alkylphenol)s, the benzylidene-bis(alkylphenol)s, and the bis or tris(dialkyl hydroxybenzyl)alkyl benzenes. Exemplary of these phenols are 4,4'-cyclohexylidene-bis(2-tert-butylphenol),
4,4'-benzylidene-bis((2-tert-butylphenol),
4,4'-(4-tert-butylcyclohexylidene)-bis(2-tert-butylphenol),
4,4'-cyclopentylidene-bis(2-tert-butylphenol),
4,4'-(3,5-dimethylbenzylidene)-bis(2-tert-butylphenol),
1,3,5-trimethyl-2,4,6-tris(3,5-di-tert-butyl-4-hydroxybenzyl)benzene, and the like.

The hydroxyphenyl polyalkylchromans are the 2- (or 4) (2'-hydroxyphenyl)chromans which have one of the following general formulae:

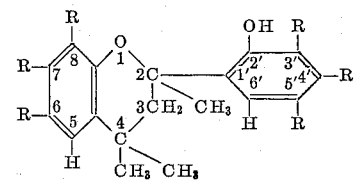

or

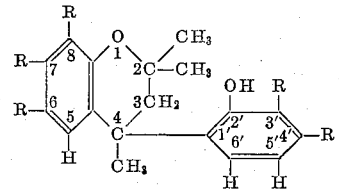

where each R may be hydrogen or alkyl, but at least one R in each of the aromatic rings is alkyl. These compounds may also be named as benzopyrans. Thus, the 2(2'-hydroxyphenyl)chromans may be named as 2,3-dihydro-2(2'-hydroxyphenyl)-1,4-benzopyrans or 3,4-dihydro-2(2'-hydroxyphenyl)-1,2-benzopyrans and the 4(2'-hydroxyphenyl)chromans may be named as 2,3-dihydro-4(2'-hydroxyphenyl)-1,4-benzopyrans or 3,4-dihydro-4(2'-hydroxyphenyl)-1,2-benzopyrans. The 2(2'-hydroxyphenyl)chromans are also sometimes named as flavans, i.e., 2'-hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2- (or 4) (2'-hydroxyphenyl)chromans are 2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5'-6-diisopropyl-2,4,4,3',8-pentamethylchroman,
2(2'-hydroxyphenyl)-5',6-di-tert-butyl-2,4,4-trimethylchroman,
4(2'-hydroxyphenyl)-5',6-di-tert-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman, 2(2'-hydroxyphenyl)-5',6-didecyl-2,4,4-trimethyl-chroman, etc.

The terpene-phenol adducts that are used in accordance with the invention are known materials that have been described frequently in the prior art. Generically defined, they are adducts of phenol or an alkylphenol that contains from 1 to 2 alkyl substituents of 1 to 10 carbon atoms each and a cyclic unsaturated terpene or dihydroterpene of empirical formula $C_{10}H_{16}$ or $C_{10}H_{18}$, respectively. They can be prepared by condensing phenol, or an alkylphenol, with the terpene, or dihydroterpene, in varying ratios in the presence of an acidic catalyst.

Suitable cyclic terpenes and dihydroterpenes from which the aforesaid adducts can be made include carvomenthene, dipentene, α-pinene, α-terpinene, terpinolene, 2-menthene, 3-menthene, dihydroterpinolene, dihydrodipentene, camphene, $\Delta^3$-carene, β-pinene, and the like. Suitable phenols, in addition to phenol itself, include the various isomeric cresols, 2,4-xylenol and other isomeric xylenols, p-sec-butylphenol, p-isopropylphenol, o-isopropylphenol, m-isopropylphenol, o,o'-diisopropylphenol, o,o'-di-tert-butylphenol, o-amylphenol, o-nonylphenol, and similar compounds.

The two reactants can be condensed in varying ratios. Any ratio within the range of 0.3 to 3 moles of terpene or dihydroterpene per mole of the phenolic compound is satisfactory, but it is preferred to employ a ratio within the narrower range of 0.5 to 2.5 moles of terpene or dihydroterpene per mole of the phenolic compound.

The adduct formation is carried out by contacting the two reactants in the presence of an acid catalyst at a temperature within the range of about 0 to 150° C. and allowing the reaction to proceed. An inert solvent may be used as a reaction medium for convenience, if so desired. Normally, the reaction will go to substantial completion in from 1½ to 5½ hours. Upon termination of the reaction, unconsumed reactants and volatile by-products can be removed by distillation at reduced pressure since the adducts themselves are high boiling materials.

The acid catalyst can be any of those acids or acidic compounds that are useful catalysts in condensation reactions generally. These include mineral acids such as sulfuric acid, organic acids such as p-toluene sulfonic acid, boron trifluoride and its derivatives, as, for instance, complexes of boron trifluoride and an ether, e.g., boron trifluoride-ethyl ether complex, metal chlorides such as aluminum chloride and stannic chloride, and acidic clays.

The terpene-phenol adducts are in all cases not a simple chemical compound but rather a mixture of compounds, principally phenolic ethers and terpenylated phenol. Thus, for instance, the adduct of 2 moles of camphene and 1 mole of p-cresol is a mixture of compounds in which mixture the principal ingredient is diisobornyl-p-cresol (the isobornyl radical being formed by isomerization of camphene) but which also contains lesser amounts of the isobornyl ether of p-cresol.

In the case of other terpenes, or dihydroterpenes, and other phenols, similar adducts are formed in which the proportion of ingredients will vary depending on the ratio of reactants and the catalyst employed. Consequently, the adducts employed in the invention are incapable of structural definition.

The thiobisphenols that can be used in accordance with the invention are well known materials and suitably include such compounds as 2,2'-thiobis(4-methyl-6-tert-butylphenol),
4,4'-thiobis(3-methyl-6-tert-butylphenol),
4,4'-thiobis(5-methyl-2-tert-butylphenol),
4,4'-thiobis(2,6-di-tert-butylphenol),
4,4'-thiobis(2-methyl-6-isopropylphenol),
4,4'-thiobis(2-ethyl-6-sec-butylphenol),
4,4'-thiobis(2,6-diisopropylphenol),
4,4'-thiobis(2-methyl-6-tert-butylphenol),
4,4'-thiobis(2-n-butoxy-6-tert-butylphenol),
4,4'-thiobis(2-methoxy-6-sec-butylphenol),
4,4'-dithiobis(2-n-propyl-6-tert-butylphenol),
4,4'-trithiobis(2-methyl-6-tert-butylphenol), and the like.

The hydroxyphenoxy substituted triazines which can be used to produce the compositions of the invention are also well known. Particuarly preferred are the hydroxyphenoxy triazines described in Belgian 610,994. Inclusive of such compounds are the mono-, di-, or tri(hydroxyphenoxy)-1,3,5-triazines, and particularly 4,6-di(4-hydroxy-3,5-di-tert-butylphenoxy) - 2-S-decyl-1,3,5-triazine, and the like.

The amount of the nickel salt and phenolic antioxidant incorporated in the polyolefin can be varied from a very small stabilizing amount up to several percent, but outstanding results have been obtained when from about 0.1 to about 5% of the nickel salt of the hydrocarbon carboxylic acid is used in combination with about 0.1 to about 5% of the phenolic antioxidant, based on the weight of polymer.

The nickel salt and the phenolic antioxidant used in accordance with this invention may be admixed with the polyolefin by any of the usual procedures for incorporating a stabilizer in a solid material. A simple method is to dissolve the stabilizers in a low-boiling solvent such as benzene or hexane, and, after thoroughly mixing the solution with the polymer in flake or other such form, evaporating the solvent; or they may be incorporated by various means of mechanical mixing, etc.

The stabilizing combination of this invention may be used in combination with other stabilizers such as other ultra-violet light absorbers, antacids such as calcium soaps, organic phosphites or other antioxidants. Other materials may also be incorporated in the polymer, as, for example, pigments, dyes, fillers, etc.

The following examples will illustrate the degree of stabilization that is obtained when a polyolefin is stabilized in accordance with this invention. The term "RSV" as used herein denotes reduced specific viscosity, which is the specific viscosity divided by concentration of a 1.0% weight/volume solution of polymer in decahydronaphthalene at 135° C. All parts and percentages are by weight unless otherwise stated, and the percentage of stabilizer is based on the weight of polymer.

*Examples 1–17*

Several compositions were prepared by blending stereoregular polypropylene having a birefrigent melting point of about 167° C. and a reduced specific viscosity of 4.0 with various amounts of the combination of stabilizers described by the invention. Each composition was extruded into molding powder at 210° C. and the molding powder pressed into sheets 25 mils thick. Strips cut from each sheet, and 0.5 inch wide, were fastened onto pieces of white cardboard and exposed to outdoor weathering in Miami, Florida, at a 45° angle facing south. During the exposure, the development of brittleness in each strip was observed by periodically folding it to an angle of 180° and noting any change taking place at the fold line. The following rating schedule was used to evaluate the degree of brittleness:

1=Unchanged from original condition
2=Slight surface crazing on fold
3=Shallow cracks on fold
4=Breaks in cheesy manner, but pieces hang together; considered failure
5=Brittle break failure Table I shows the formulation of each composition and the results of outdoor exposure.

TABLE I

| | Compositions [1] | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Nonylphenol-acetone reaction product [2] | | | 0.5 | 1.0 | 1.5 | 2.0 | 0.5 | 1.0 | | | | | | | | | |
| Mixture of 4,4'-n-butylidene bis(2-tert-butyl-5-methylphenol) and diphenyl isooctyl phosphite [3] | | | | | | | | | 1.7 | | | 1.7 | 2.2 | | | | |
| 4,4'-n-butylidene bis(2-tert-butyl-5-methylphenol) | | | | | | | | | | 1.1 | | | | 1.1 | 1.6 | | |
| 2,2'-methylene bis(4-methyl-6-tert-butylphenol) | | | | | | | | | | | 1.0 | | | | | 1.0 | 1.5 |
| Nickel 2-ethyl hexanoate | 0.5 | 1.0 | 0.5 | 0.5 | 0.5 | 1.0 | | | 0.5 | 0.5 | 0.5 | | | | | | |
| | Ratings after Florida Exposure | | | | | | | | | | | | | | | | |
| 30,000 Langleys | ([4]) | ([4]) | 3 | 3 | 2 | 3 | 5 | 5 | 5 | 4 | 5 | 5 | 5 | 5 | 5 | 5 | 5 |
| 20,000 Langleys | ([4]) | ([4]) | 3 | 3 | 2 | 2 | 5 | 5 | 2 | 3 | 3 | 5 | 5 | 5 | 5 | 5 | 5 |

[1] In parts per 100 parts polymer, each composition also contained 0.4 part calcium stearate as an antacid.
[2] Prepared by reaction of 2 moles n-nonylphenol and 1 mole of acetone under acid conditions [mixture of 2,2'-isopropylidene-bis(4-nonylphenol) and 2'-(2—hydroxyphenyl)-2,4,4-trimethyl-5',6-dinonylchroman].
[3] Mixture prepared by heating 1 part of the phenol per 2.5 parts of the phosphite at elevated temperature according to the procedure described in Belgian 604,245 to improve compatibility with the polymer.
[4] Brittle on molding; could not be tested.

*Example 18*

Polyethylene having a density of 0.96 was stabilized with 0.5% nickel 2-ethylhexanoate and 0.5% of the product obtained by reacting 2 moles n-nonylphenol and 1 mole of acetone under acid conditions [mixture of 2,2'-isopropylidene-bis(4 - nonylphenol) and 2'-2-hydroxyphenyl)-2,4,4-trimethyl-5',6-dinonylchroman] in the manner of Examples 1-17 except that the embrittlement time was determined in a fadeometer by periodically examining the strip and noting the time elapsed until a strip breaks when bent double. The control sample containing no stabilizer failed in 7 days whereas the stabilized composition was still flexible after 15 days.

*Examples 19–20*

The procedure of Example 3 was repeated using nickel 2,2,4,4-tetramethyl pentanoate and nickel 2,4,6-trimethyl heptanoate in place of nickel 2-ethyl hexanoate. Each of the compositions gave an outdoor exposure rating in Florida of 2 at 20,000 Langleys and 3–4 at 30,000 Langleys.

*Examples 21–26*

In these examples 210-denier, 35-filament yarns (6 denier per filament) were prepared by melt spinning at 270° C. various blends of 100 parts of stereoregular polypropylene having a birefringent melting point of about 167° C. and a reduced specific viscosity of 3.6, 0.15 part of the nonylphenol-acetone reaction product of Examples 3–8, and 0.1 part calcium stearate as an extrusion aid with and without various of the nickel carboxylates of the invention, the amount of nickel carboxylate when used being equivalent to 0.12 part nickel per 100 parts of blend. The yarns were clamped in a picture frame type holder and exposed to outdoor weathering in Miami, Florida, at a 45° angle facing south. Embrittlement due to exposure was evaluated at intervals by removing some of the samples and measuring the percent elongation and the force (grams/denier) at break when a 4" strand of the yarn was extended at the rate of 4"/min. in a constant rate of specimen extension machine at 23° C. Table II gives details of the compositions and the results of tenacity and elongation tests before and after outdoor exposure.

TABLE II

| Ex. No. | Nickel Carboxylate | Florida Exposure (Langleys) | | | | | | | | | |
|---|---|---|---|---|---|---|---|---|---|---|---|
| | | 0 | | 30,000 | | 40,000 | | 50,000 | | 60,000 | |
| | | Tenacity (g./d.) | Elong. (Percent) | Tenacity (g./d.) | Elong. (Percent) | Tenacity (g./d.) | Elong. (Percent) | Tenacity (g./d.) | Elong. (Percent) | Tenacity (g./d.) | Elong. (Percent) |
| 21 | | 5.8 | 44 | 3.7 | 15 | 3.2 | 21 | 1.6 | 6 | 0.64 | 2 |
| 22 | Nickel tridecanoate | 5.7 | 48 | 5.4 | 34 | 5.3 | 43 | 4.9 | 32 | 2.7 | 20 |
| 23 | Nickel palmitate | 5.6 | 43 | 4.7 | 26 | 3.6 | 22 | 2.8 | 14 | 1.9 | 10 |
| 24 | Nickel stearate | 5.5 | 47 | 5.0 | 32 | 4.2 | 30 | 3.7 | 19 | 2.8 | 14 |
| 25 | Nickel caprylate | 5.5 | 66 | 4.2 | 23 | 2.7 | 16 | 2.2 | 9 | 1.0 | 7 |
| 26 | Nickel caprate | 5.5 | 65 | 3.5 | 26 | 2.8 | 16 | 2.0 | 10 | 1.2 | 5 |

*Examples 26–28*

The procedure of Examples 21–26 was repeated except that the blends contained 0.5 part of the nonylphenol-acetone reaction product and either 2.0 parts of nickel 2-ethyl hexanoate (Example 27) or 2.2 parts of nickel tridecanoate (Example 28), the amount of nickel carboxylate being equivalent to 0.12 part nickel per 100 parts of the blend. Tenacity and elongation data for these compositions after outdoor exposure are tabulated below.

TABLE III

| Ex. No. | Outdoor Exposure (Langleys) | | | | | | | | | | | |
|---|---|---|---|---|---|---|---|---|---|---|---|---|
| | 0 | | 30,000 | | 40,000 | | 50,000 | | 60,000 | | 78,000 | |
| | Tenacity (g./d.) | Elong. (percent) | Tenacity (g./d.) | Elong. (percent) | Tenacity (g./d.) | Elong. (percent) | Tenacity (g./d.) | Elong. (percent) | Tenacity (g./d.) | Elong. (percent) | Tenacity (g./d.) | Elong. (percent) |
| 27 | 5.3 | 73 | 5.2 | 44 | 5.0 | 48 | 4.6 | 30 | 3.7 | 25 | 1.4 | 17 |
| 28 | 6.2 | 52 | 5.8 | 37 | 5.6 | 41 | 5.4 | 35 | 4.7 | 30 | 2.8 | 28 |

What I claim and desire to protect by Letters Patent is:

1. A polyolefin selected from the group consisting of polyethylene and a stereoregular polymer of a mono-α-olefin having at least 3 carbon atoms containing as a light stabilizer therefor, based on the weight of the polyolefin, from about 0.1 to about 5% of a nickel salt of a hydrocarbon carboxylic acid containing 2 to 22 carbon atoms and from about 0.1 to about 5% of a phenolic antioxidant selected from the group consisting of trialkylphenols, aralkyl dialkyl substituted phenols, dialkylhydroxybenzyl substituted phenols, poly(alkylphenol) substituted hydrocarbons, hydroxyphenyl polyalkylchromans, adducts of an alkylphenol and a cyclic terpene, thiobis(alkylphenol)s, and hydroxyphenoxy substituted triazines.

2. The composition of claim 1 in which the polymer is polypropylene.

3. The composition of claim 1 in which the polymer is polyethylene.

4. The composition of claim 1 in which the nickel salt is selected from the group consisting of nickel 2-ethylhexanoate, nickel 2,2,4,4-tetramethylpentanoate, 2,4,6-trimethylheptanoate, nickel tridecanoate, nickel palmitate, nickel stearate, nickel caprylate, and nickel caprate.

5. Stereoregular polypropylene containing as a light stabilizer therefor, based on the weight of the polypropylene, from about 0.1 to about 5% of nickel 2-ethylhexanoate and from about 0.1 to about 5% of the reaction product of nonylphenol and acetone, said reaction product comprising a mixture of 2,2'-isopropylidene-bis(4-nonylphenol) and 2'-(2-hydroxyphenyl)-2,4,4-trimethyl-5',6-dinonylchroman.

6. Stereoregular polypropylene containing as a light stabilizer therefor, based on the weight of the polypropylene, from about 0.1 to about 5% of nickel 2-ethylhexanoate and from about 0.1 to about 5% of 4,4'-n-butylidene-bis(2-tert-butyl-5-methylphenol).

References Cited by the Examiner

UNITED STATES PATENTS

| | | | |
|---|---|---|---|
| 2,984,634 | 5/1961 | Caldwell et al. | 260—23 |
| 3,006,885 | 10/1961 | Dickson | 260—45.75 |
| 3,006,886 | 10/1961 | Schilling | 260—45.75 |
| 3,072,601 | 1/1963 | Breslow | 260—45.75 |
| 3,074,909 | 1/1963 | Matlack | 260—45.75 |
| 3,074,910 | 1/1963 | Dickson | 260—45.75 |
| 3,102,107 | 8/1963 | Soeder | 260—45.75 |
| 3,107,232 | 10/1963 | Matlack | 260—45.75 |
| 3,127,372 | 3/1964 | Matlack | 260—45.75 |

LEON J. BERCOVITZ, *Primary Examiner.*

DONALD E. CZAJA, *Examiner.*

R. W. RAUCHFUSS, *Assistant Examiner.*